United States Patent [19]

Ohno et al.

[11] Patent Number: 4,544,247
[45] Date of Patent: Oct. 1, 1985

[54] STEREOSCOPIC PROJECTING APPARATUS

[75] Inventors: Yoshio Ohno, Oosaka; Katsuhiko Koyama; Kohsaku Nishio, both of Ootawara, all of Japan

[73] Assignees: Photron Ltd., Oosaka; Tokyo Shibaura Denki Kabushiki Kaisha, Kawasaki, both of Japan

[21] Appl. No.: 563,987

[22] Filed: Dec. 21, 1983

[30] Foreign Application Priority Data

Dec. 24, 1982 [JP] Japan .................. 57-233175

[51] Int. Cl.$^4$ .................. G03B 35/02; G03B 41/06
[52] U.S. Cl. .................. 352/62; 352/65; 352/119
[58] Field of Search .................. 355/22; 354/112; 352/57–59, 62–65, 60, 116–119, 66; 353/7–9

[56] References Cited

U.S. PATENT DOCUMENTS

| | | | |
|---|---|---|---|
| 2,329,294 | 9/1943 | Ramsdell | 352/57 |
| 2,476,504 | 7/1949 | Maytum | 352/119 |
| 2,478,891 | 8/1949 | Bernier | 352/62 |
| 3,586,429 | 6/1971 | Cords, Jr. | 352/62 |
| 3,752,568 | 7/1973 | Perreau | 352/119 |

Primary Examiner—L. T. Hix
Assistant Examiner—Della J. Rutledge
Attorney, Agent, or Firm—Cushman, Darby & Cushman

[57] ABSTRACT

A stereoscopic projecting apparatus has a polyhedral prism and two types of polarizing filters which are arranged at the incident (or emerging) planes of the prism and which have orthogonal deflecting directions. Left and right-eye pictures are alternately formed on the consecutive frames of a cinefilm. The cinefilm is driven in such a way as to cross the projection region of light emitted from a lamp. An optical image transmitted from the cinefilm is projected onto a screen by the polyhedral prism, through a relay lens, a projection lens or the like. The left and right-eye images are deflected in directions 90° apart from each other, by the polarizing filters at the respective incident or emerging planes of the prism. A viewer can stereoscopically observe the image superimposed on the screen, using polarized viewing glasses having polarized lenses deflected in the deflecting directions of the images.

9 Claims, 19 Drawing Figures

| PLANE NUMBER | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| DEFLECTING DIRECTION | ↗ | ↗ | ↗ | ↗ | ↗ | ↗ | ↗ | ↗ | ↗ | ↗ | ↗ | ↗ | ↗ | ↗ | ↗ | ↗ |

| PLANE NUMBER | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| DEFLECTING DIRECTION | ↑ | ← | ↑ | ← | ↑ | ← | ↑ | ← | ↑ | ← | ↑ | ← | ↑ | ← | ↑ | ← |

STEREOSCOPIC PROJECTING APPARATUS

BACKGROUND OF THE INVENTION

The present invention relates to a stereoscopic projecting apparatus for use in projecting a stereoscopic image which can be stereoscopically observed through polarized viewing glasses.

There is a strong demand for a device which would allow for the stereoscopic observation of an image in X-ray diagnosis techniques.

Blood vessels are distributed within the human heart in a complex manner. For this reason, to perform reliable diagnosis by an angiography, the image of a blood vessel of the heart should be stereoscopically observable.

Figure 1:
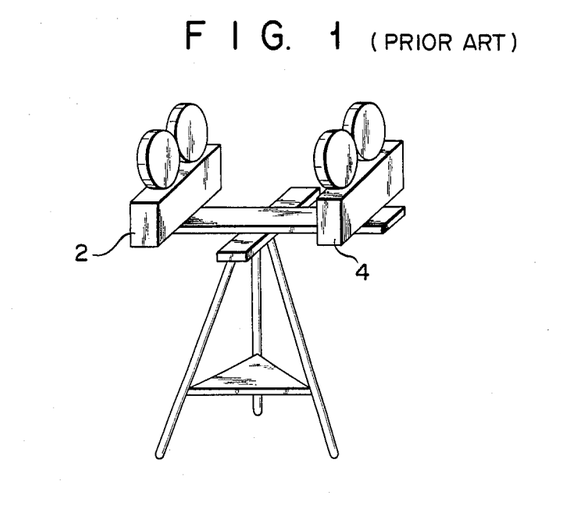
FIGS. 1 and 2 are schematic views showing a conventional stereoscopic projecting technique.
Figure 2:
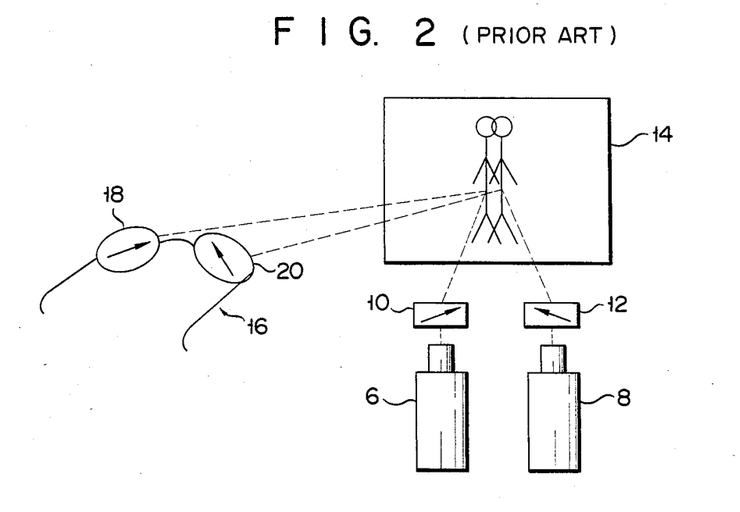

FIGS. 1 and 2 schematically show a conventional stereoscopic projecting technique. Two cinecameras 2, 4, which are separated by a distance corresponding to the standard distance between a pair of human eyes, are used to take pictures of the same size of an object at the same time. A cinefilm photographed by the left-eye cinecamera 2 is mounted on a left-eye projector 6, while a cinefilm photographed by the right-eye cinecamera 4 is mounted on a right-eye projector 8. Polarized filters 10 and 12, having deflection angles which are perpendicular to each other, are arranged in the optical paths of projectors 6 and 8, respectively. The left-eye image and the right-eye image are projected from their respective projectors 6, 8 and are superposed on a screen 14, through the filters 10, 12. The image on the screen 14 may be observed by a viewer wearing polarized viewing glasses 16 which have left-eye polarized glass 18 having the same deflection angle as filter 10 and right-eye polarized glass 20 having the same deflection angle as filter 12. Thus, the viewer observes the image photographed by cinecamera 2 with his left eye, and observes the image photographed by cinecamera 4 with his right eye, thereby making a stereoscopic observation of the image of an object.

However, the conventional stereoscopic projecting apparatus described above has the following problems. In order that the image of the left eye and the image of the right eye may be projected as superposed on the screen 14, the cinefilm frame feed speed of the two projectors 6, 8 must be the same, and cinefilms for the left and right eyes must be fed in synchronism with each other. However, in general, there is a slight difference between the frame feed speeds of the projectors 6, 8. For this reason, when projection is performed over a long period of time, the left-eye image and the right-eye image do not coincide with each other and stereoscopic projection cannot be performed. For projection over a long period of time, a plurality of cinefilms must be used in succession. In such a case, observation must be interrupted for each cinefilm replacement in the two projectors 6, 8, and for synchronization between the two projectors, preventing ready observation. To avoid this problem, four projectors may be used, with two projectors being started just prior to the time the other two projectors finish projecting. However, it is impractical to use four projectors.

SUMMARY OF THE INVENTION

A primary object of the present invention is to provide a stereoscopic projecting apparatus which is capable of projecting a stereoscopic image by means of a single projector.

Another object of the present invention is to provide a stereoscopic projecting apparatus which is capable of projecting a left-eye image and a right-eye image, without misalignment, over a long period of time.

Still another object of the invention is to provide a stereoscopic projecting apparatus which is capable of projecting a stereoscopic image by means of a simple operation.

According to one aspect of the present invention, a stereoscopic projecting apparatus is provided, which projects a stereoscopic image by use of a cinefilm on which left-eye pictures and right-eye pictures are alternately formed on consecutive frames. Said stereoscopic projecting apparatus comprises a light source for projecting a beam of light toward a predetermined region; drive means for driving a cinefilm in such a way that the cinefilm passes through the region toward which the light from the light source is being projected; a prism arranged in the region through which an image transmitted from the cinefilm is passed, the prism having a plurality of planes through which the image becomes incident or from which it emerges and which are endlessly connected; prism rotating means for rotating the prism about a rotating axis of the prism which includes the center of the plurality of planes and is parallel to the plurality of planes; synchronizing means for synchronizing the movement of the cinefilm and the rotation of the prism, so that each of the planes of the prism becomes parallel to the surface of the cinefilm when each one of the frames of the cinefilm is located at the center of the region toward which the light is being projected; and deflecting means for deflecting the image, which deflecting means deflects a left-eye image transmitted from the frame on which the left-eye picture is formed in a first direction, and deflects a right-eye image transmitted from the frame on which the right-eye picture is formed in a second direction, the first and second directions being perpendicular to each other.

According to the present invention, the cinefilm used is one in which left-eye pictures and right-eye pictures are alternately formed on consecutive frames. The left-eye images and right-eye images transmitted from such a cinefilm are deflected in the first and second directions, respectively, which are perpendicular to each other. Therefore, a left-eye image and a right-eye image are deflected in orthogonal directions and are superimposed on a screen or the like. The apparatus of the present invention can thus project a stereoscopic image by a single projector. Unlike a conventional case, in which two projectors are used, a left-eye image and a right-eye image do not become misaligned after a long period of projection. Furthermore, since only a single projector is used, the operation is simple. Even if a plurality of cinefilms are to be used in succession, continuous projection can be performed with only one other supplementary projector, as in the case of a general theater. Moreover, a stereoscopic image carries a lot of information as compared to a two-dimensional image. Therefore, X-ray photography from various directions need not be performed in X-ray diagnostic photography, so that the X-ray exposure of a patient is reduced, and the patient's safety is better assured.

DETAILED DESCRIPTION OF THE PREFERRED EMBODIMENTS

Figure 3:
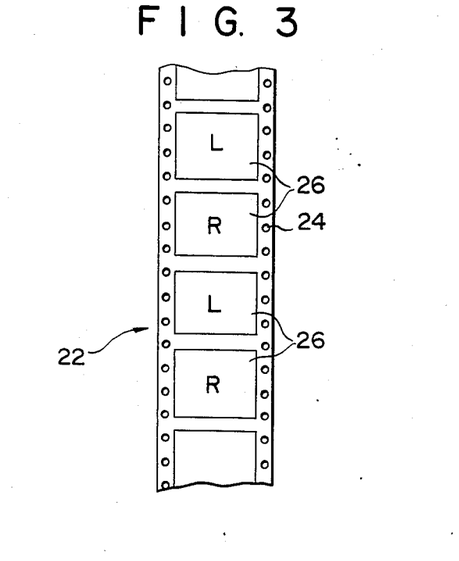
FIG. 3 is a plan view showing an example of the cinefilm used in the present invention.

FIG. 3 shows an example of a cinefilm 22 to be mounted on a stereoscopic projecting apparatus of the present invention. Perforations 24 for meshing with the rotary sprockets of a general projector are formed at the two sides of the cinefilm 22. Left-eye pictures L and right-eye pictures R are alternately formed on consecutive frames 26 of the cinefilm 22.

The cinefilm 22 can be obtained in the following manner. As shown in FIG. 1, left and right-eye negative cinefilms are exposed by cinecameras 2 and 4, respectively. The obtained negative cinefilms are mounted on an optical printer and are printed on a single cinefilm, in such a way that a left-eye picture and a right-eye picture appear alternately.

Figure 4:
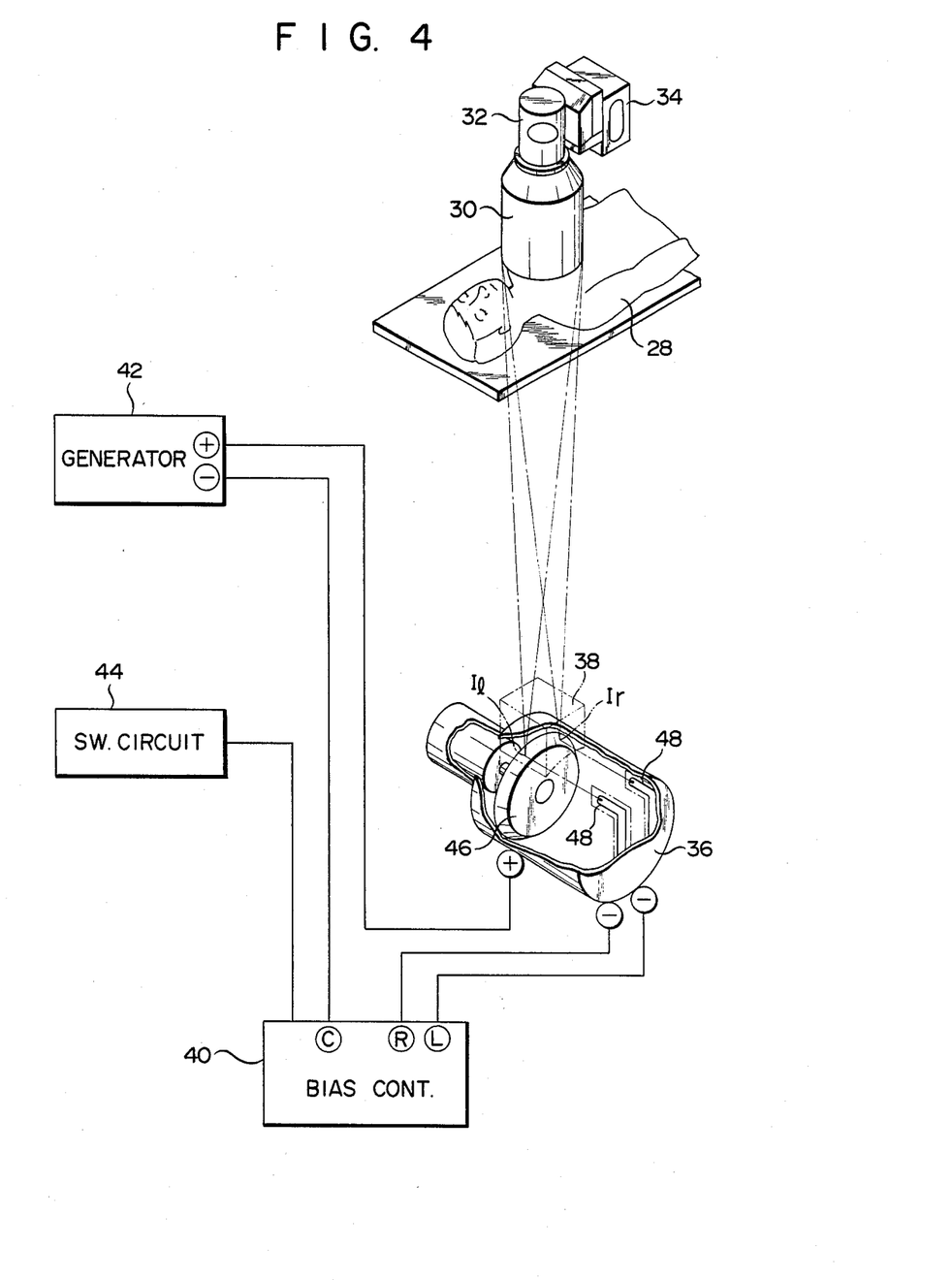
FIG. 4 is a perspective view showing the manner of conducting the fluoroscopy of a patient.

The cinefilm 22 can alternatively be obtained in the manner shown in FIG. 4. FIG. 4 shows a method of conducting the fluoroscopy of a patient or an object 28 to be examined for X-ray diagnosis. The patient 28 is laid down on a base which transmits X-rays. A stereoscopic X-ray tube 36 and a diaphragm 38 are arranged below the patient 28. An image intensifier 30, an optical system 32 and a cinecamera 34 are arranged above the patient 28. A disc-shaped anode 46 is rotatably arranged inside of the X-ray tube 36. A pair of cathodes 48 each having a grid oppose the anode 46 and are spaced apart from each other by a distance corresponding to the standard distance (i.e., 63 mm) between a pair of human eyes. The bias voltages of the grids of the cathodes 48 are controlled by a bias controller 40. A high voltage from a high voltage generator 42 is applied across the anode 46 and the cathodes 48. The positive terminal of the high voltage generator 42 is directly connected to the anode 46, while the negative terminal thereof is connected to the controller 40. A stereo switching circuit 44 is also connected to the controller 40. In synchronism with the shutter release operation of the cinecamera 34, the switching circuit 44 produces a control signal for X-ray exposure of the controller 40. Every time the shutter of the cinecamera 34 is released, a predetermined grid voltage is alternately applied to the grids of the cathodes 48, to generate electron beams which move from the cathodes 48 to the anode 46. The electron beam alternately produced from each of the pair of cathodes 48 becomes incident on two focal points Il and Ir of the anode 46, which are spaced apart from each other by 63 mm and from which X-rays are alternately emitted. The X-rays are focused by the diaphragm 38 and expose the patient 28. The X-rays transmitted through the patient 28 become incident on the image intensifier 30. The X-ray image transmitted through the patient 28 is converted into an optical image by the image intensifier 30. The optical image is supplied to the cinecamera 34 through the optical system 32 and is photographed by the cinecamera 34. Every time the shutter of the cinecamera 34 is released, the X-ray image from focal point Il or Ir becomes alternately incident on the cinecamera 34. Then, as shown in FIG. 3, a cinefilm 22 is obtained wherein X-ray left-eye pictures L emerging from focal point Il and X-ray right-eye pictures Ir emerging from focal point Ir are alternately formed on consecutive frames 26.

A stereoscopic projecting apparatus 60 according to an embodiment of the present invention may be described as follows, with reference to FIGS. 5 to 7. As may be seen from the plan view of FIG. 5, a cinefilm drive means 62 has a cinefilm supply reel 64, a pair of rotary sprockets 66, 72, and a cinefilm take-up reel 78. The cinefilm 22 wound on the cinefilm supply reel 64 is supplied from the reel 64, guided by a guide roller, and supplied to the rotary sprocket 66. The sprocket 66 is fixed to a pivot shaft 68 to which a gear 70 is coaxially fixed. The sprocket 72 is fixed to a pivot shaft 74 to which a gear 76 is coaxially fixed. The pivot shafts 68 and 74 are parallel to each other. When the pivot shafts 68 and 74 rotate in the direction indicated by the arrow, with the sprockets 66 and 72 meshing with the perforations 24 of the cinefilm 22, the cinefilm 22 is driven from sprocket 66 to sprocket 72. The cinefilm 22 is wound onto the take-up reel 78, through the sprocket 72. When the cinefilm 22 is exposed by the apparatus shown in FIG. 4, the frame feed speed of the sprockets 66, 72 can be so set as to equal that of the cinecamera 34. However, if the cinefilm 22 is exposed by the general cinecameras 2, 4 shown in FIG. 1, the sprockets 66, 72 are rotated in such a way that the cinefilm 22 can be driven at a speed equal to twice (48 frames/sec) the frame feed speed (e.g., 24 frames/sec) of the general projector. This is to establish a coincidence between the number of left-eye frames and the number of right-eye frames projected per unit time, with respect to the frame feed speed during photography (i.e., 24 frames/sec).

A light source 80 has a lamp 82 and condenser lenses 84. Light from the lamp 82 is colimated by the condenser lenses 84 and becomes incident on that portion of the cinefilm 22 which is between the sprockets 66, 72, in such a way that its optical axis is perpendicular to the surface of the cinefilm 22, as indicated by the alternate long and short dashed line of FIG. 5.

A light guide means 90 and a deflecting means 100 are arranged on the optical axis of the light transmitted through the cinefilm 22. The light guide means 90 mainly comprises a polyhedral (polygonal) prism 92 having a polyhedral shape. A pivot shaft 94 of the light guide means 90 is pivotally mounted at such a location as to cross the optical path of the light transmitted through the cinefilm 22, so that said pivot shaft 94 is parallel to pivot shafts 68 and 74. A base 96 is fixed to the upper end of the pivot shaft 94. The prism 92 is placed on the base 96, in such a way that the center of the polyhedron is aligned with the rotating axis of the pivot shaft 94. The vertical position of the polyhedral prism 92 is so determined that the optical path of the light (indicated by the alternate long and short dashed line of FIG. 5) transmitted through the cinefilm 22 passes substantially midway in the direction of thickness of the polyhedral prism 92. The side surfaces of the polyhedral prism 92 respectively have a sufficient area to allow for the transmission of the optical images transmitted from the frames 26 of the cinefilm 22. A gear 98 meshing with gears 70 and 76 is coaxially mounted on the pivot shaft 94. The gears 98, 70, 76 are so arranged as to provide synchronization between the rotation of the polyhedral prism 92 and travel of the cinefilm 22. In other words, if the cinefilm 22 is transferred from the time when a certain frame 26 of the cinefilm 22 is so located parallel to a certain incident plane (side surface) of the polyhedral prism 92 to the time when the next frame 26 is located on the optical axis of the lamp 82, the polyhedral prism 92 must be rotated in such a way that the next (adjacent) incident plane becomes parallel to the next frame 26. For this purpose, the gear ratio t of gear 98 and gears 70 and 76 must coincide with ratio n/N, where N is the number of frames 26 of that portion of the cinefilm 22 which corresponds to the entire perimeter of the sprockets 66, 72, and n is the number of incident (or emerging) planes of the polyhedral prism 92. This is for the following reason. When the rotational frequency of the sprockets 66, 72 is given as R (turns/sec), the rotational frequency of the polyhedral prism 92 is given as R/t (turns/sec). Accordingly, the number of frames which pass through the optical path of the light projected from the lamp 82, per unit time, is given as RN. Similarly, the number of incident (or emerging) planes of the polyhedral prism 92 which pass through the optical path of the projected light is given as Rn/t. Since both must coincide, t=n/N, and the gear ratio t must therefore be determined by the ratio n/N. Note that the pivot shafts 74 and 94 are driven at a constant speed by a motor (not shown). The position of the cinefilm 22 and the rotating position of the polyhedral prism 92 must be initially adjusted, so that a frame 26 of the cinefilm 22 and an incident plane of the polyhedral prism 92 are parallel to each other upon mounting of the cinefilm 22 on the sprockets 66, 72. For this purpose, a known frame adjusting mechanism is mounted on one or each of gear 98 and gears 70 and 76.

Figure 7:
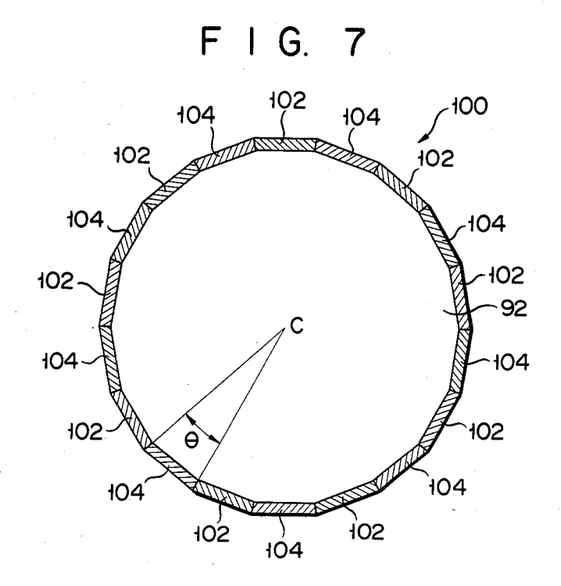
FIG. 7 is a plan view of a polyhedral prism.
Figure 8A:
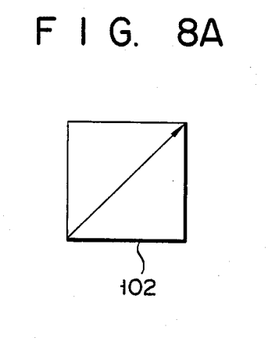
FIGS. 8A and 8B are representations showing the deflecting directions of polarizing filters.
Figure 8B:
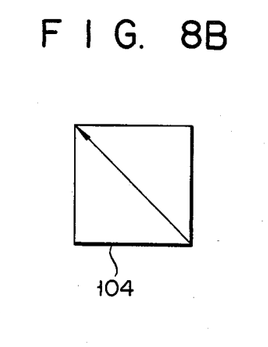
Figure 9A:
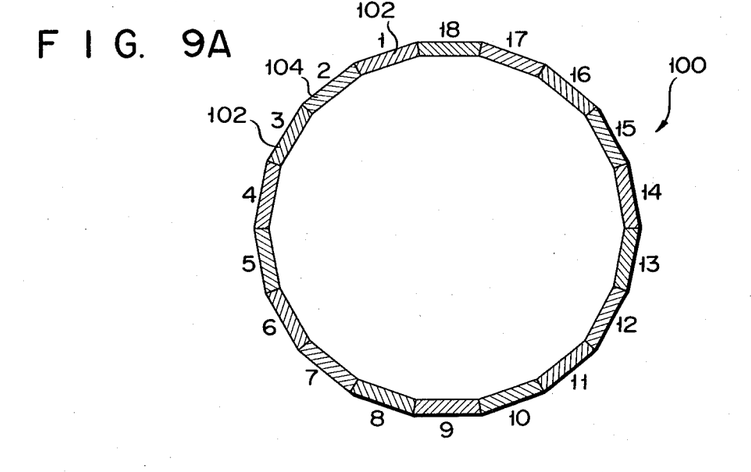
FIGS. 9A and 9B, 10A and 10B, and 11A and 11B are representations showing the deflecting directions and arrangements of polarizing filters.
Figure 9B:
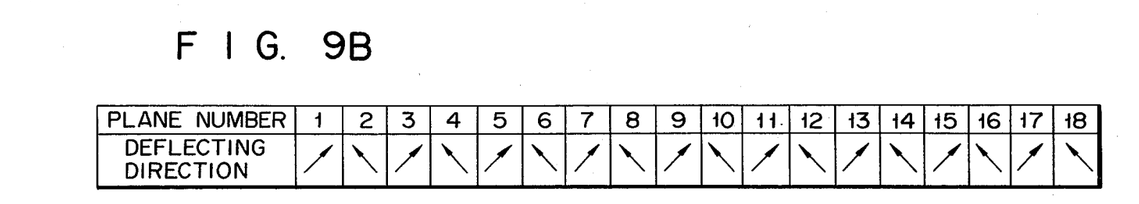
Figure 10A:
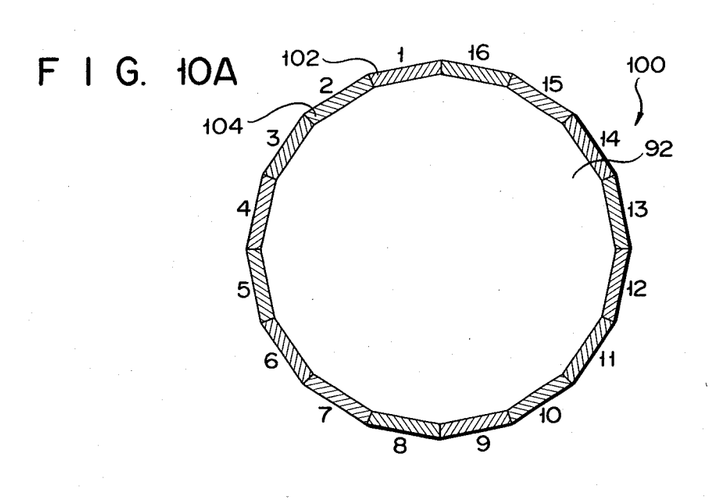
Figure 10B:
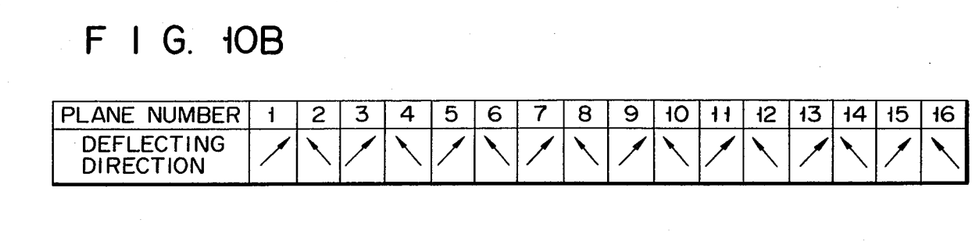
Figure 11A:
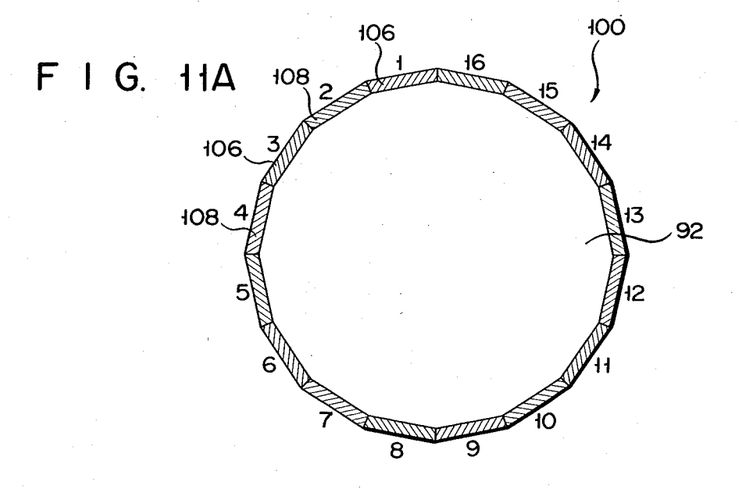
Figure 11B:
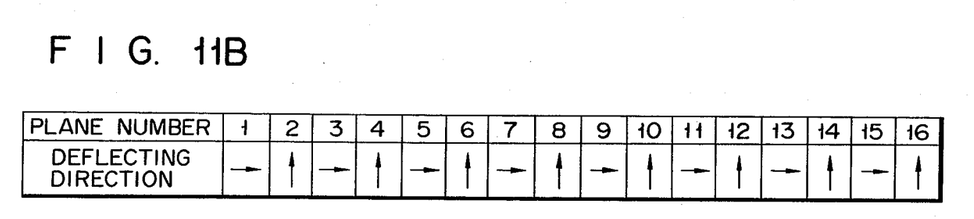

The deflecting means 100 has two types of polarizing filters 102, 104, which filters have deflecting directions which are rotated 90°, as shown in FIGS. 5, 7, 8A and 8B. Each of the polarizing filters 102, 104 has a rectangular shape, including a region for passing therethrough an optical image transmitted from each frame 26 of the cinefilm 22. The polarizing filters 102, 104 are alternately adhered to the incident (or emerging) planes of the polyhedral prism 92. The deflecting directions of the polarizing filters 102, 104 are inclined 45°, with respect to the plane (upper or lower surface of the polyhedral prism 92) perpendicular to the pivot shaft 94, and are perpendicular to each other. The total number of polarizing filters 102, 104 (i.e., the total number of incident or emerging planes of the polyhedral prism 92) is set to be 2(2n+1), as shown in FIGS. 7 and 9A, where n is an integer. The total number of polarizing filters 102, 104 is 18 (n=4) in the apparatus shown in the drawings. The total number of polarizing filters is set at 2(2n+1) for the following reason. In FIG. 9A, the incident (or emerging) planes are numbered. In FIG. 9B, the deflecting directions of the polarizing filters arranged at the incident (or emerging) planes corresponding to the respective plane numbers are indicated by arrows. The deflecting directions of the polarizing filters of a pair of planes (the first and tenth planes, the second and eleventh planes, etc.), which planes are parallel to each other and oppose each other with respect to the center of rotation C of the polyhedral prism 92, are perpendicular to each other (their orientations being parallel to each other). The deflecting directions of these filters 102 and 104 appear identical when viewed in the direction of propagation of light. Therefore, light which has passed through the polarizing filter 102 at the first plane, becoming incident on the polyhedral prism 92, is guided through the center of rotation C and then emerges through the polarizing filter 104 at the tenth plane. This is only achieved when the total number of polarizing filters is set to be 2(2n+1) and the polarizing filters 102, 104 having orthogonal deflecting directions are arranged at the incident (or emerging) planes. By way of contrast, if the total number of polarizing filters is set at 4n, as shown in FIGS. 10A and 10B, polarizing filters 102, 104 having the same type oppose each other through the center of rotation C. Accordingly, light which has passed through the polarizing filter 102 at the first plane cannot pass through the polarizing filter 102 at the ninth plane since the orientation of the deflecting direction of the former is perpendicular to that of the later when viewed in the direction of propagation of light. As shown in FIGS. 11A and 11B, it is also possible to arrange on alternate incident planes of the polyhedral prism 92 polarizing filters 106 having deflecting directions parallel to the upper surface of the prism 92 and polarizing filters 108 having deflecting directions perpendicular to the upper surface of the prism 92. In this case, the total number of polarizing filters can be set to be an even number (2n). However, according to an experiment conducted by the present inventors, an optical image transmitted through the polarizing filters 106 at the first and ninth planes, and an optical image transmitted through the polarizing filters 108 at the second and tenth planes, have different color tones. This results in a different color tone between the left-eye half image and the right-eye half image, and, hence, viewer eye fatigue results. Accordingly, the use of such polarizing filters 106, 108 is not preferable. By way of contrast, when polarizing filters 102, 104 crossing the upper surface of the polyhedral prism 92 at an angle of 45° are used, as shown in FIGS. 9A and 9B, no color tone difference is produced between the optical images transmitted through these filters and, thus, no viewer eye fatigue occurs.

Figure 12:
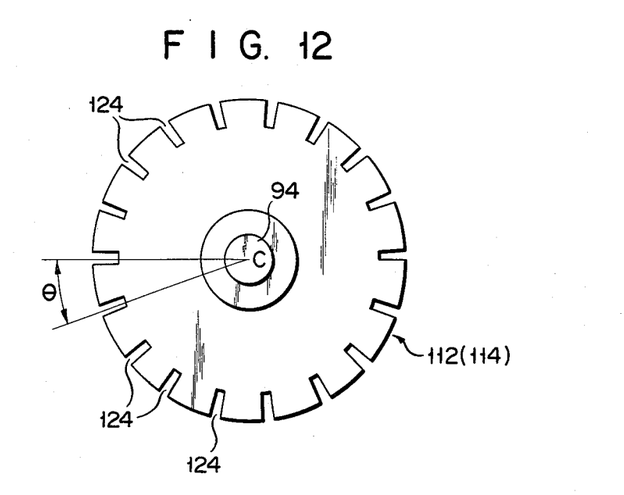
FIG. 12 is a plan view of a slit disc.

The rotating position detecting means 110 of the polyhedral prism 92 has a pair of slit discs 112, 114 which are coaxially mounted on the pivot shaft 94. FIG. 12 shows a plan view of the slit disc 112 or 114. Radial slits 124 are formed at the perimeter of each of the slit discs 112 and 114 from the outer periphery toward the center. The angle $\theta$ at which a pair of adjacent slits 124 subtend at the center of rotation C is equal to the angle $\theta$ (See FIG. 7) at which the two ends of each of the polarizing filters 102, 104 in the rotating direction of the polyhedral prism subtend at the center of rotation C. As shown in FIG. 6, photosensors 116 and 118 are so arranged as to oppose the perimeters of the slit discs 112 and 114, respectively. The photosensor 116 is arranged at such a position as to oppose each slit 124 of the slit disc 112 when each polarizing filter or each incident plane of the polyhedral prism 92 becomes parallel to the cinefilm 22. Photosensor 116 produces a detection signal which is ON when the incident plane is parallel to the cinefilm 22. Photosensor 118 is located at such a position as to oppose each slit 124 of the slit disc 114 when each polarizing filter or each incident plane of the polyhedral prism 92 becomes parallel to the cinefilm 22. Photosensor 118 produces a detection signal which is ON when the two adjacent incident planes are inclined at the same angle with respect to the surface of the cinefilm 22. Outputs from photosensors 116 and 118 are supplied to a rotation control device 122 of the sprockets 66, 72, through a switch 120. The rotation control device 122 supplies a stop signal to the motor and the like, driving the pivot shaft 94 or the pivot shafts 68, 74 in such a way as to stop the rotation of the sprockets 66, 72 upon the reception of an ON signal from photosensor 116 or 118.

Relay lenses 126 and a projection lens 128 are arranged on the optical path of the light transmitted through the polyhedral prism 92 and the polarizing filters 102, 104. The optical images transmitted through the polyhedral prism 92 and the polarizing filters 102, 104 are projected onto a screen 132 (See FIG. 13) through the relay lenses 126 and the projection lens 128.

Figure 13:
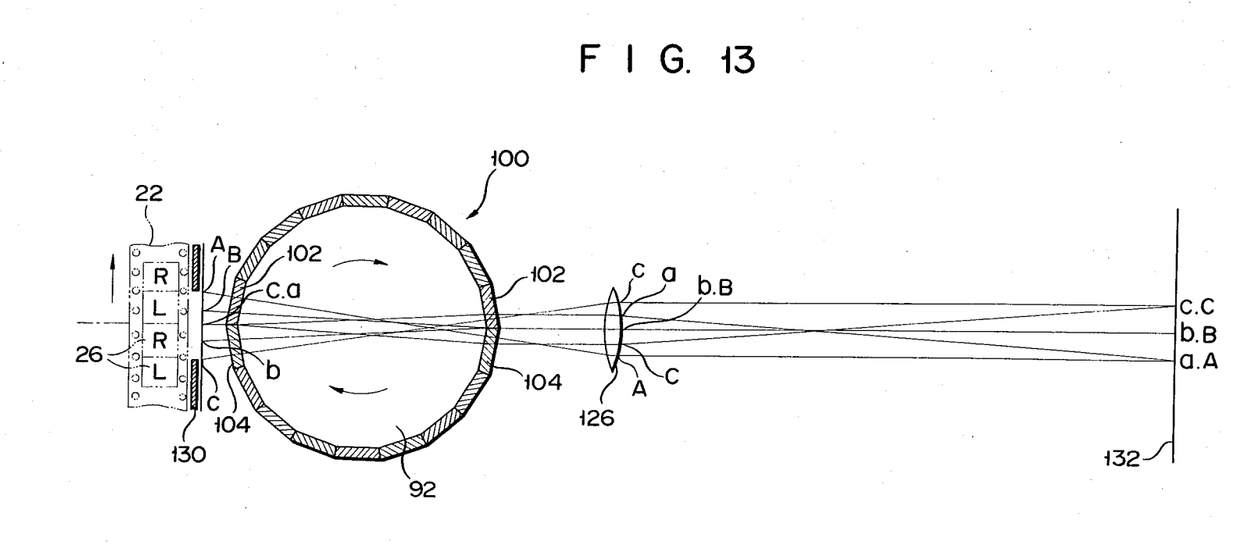
FIG. 13 is a representation for explaining the mode of operation of the stereoscopic projecting apparatus shown in FIG. 5.

The mode of operation of the stereoscopic projecting apparatus having the configuration described above may be described as follows. The cinefilm 22 is supplied from the supply reel 64, being driven at normal speed by the sprockets 66, 72, and is wound on the take-up reel 78. Light from the lamp 82 is colimated by the condenser lenses 84, and then becomes incident on the cinefilm 22. FIG. 13 shows the optical paths of the optical images transmitted through the cinefilm 22 together with the respective members. A projection slit 130 having an aperture size corresponding to 2 frames is formed at the surface of the cinefilm 22 passing along the optical path of the projected light which is at the side of the projected light. An optical image of 2 frames, which has passed through the slit 130, becomes incident on the polarizing filter 102 and/or 104. After the optical image is transmitted through the polyhedral prism 92, it emerges through polarizing filter 104 and/or 102. The optical image is then projected onto the screen 132.

Gears 70 and 76 mesh with gear 98, so that the sprockets 66, 72 and the polyhedral prism 92 may rotate in synchronism with each other. When the frame 26 on which the left-eye picture is formed is on the optical path of the projected light, (which is indicated by the alternate long and short dashed line of FIG. 13) i.e., when this frame 26 is at the center of the opening region of the slit 130, the polarizing filter 102 becomes parallel thereto. On the other hand, when the frame 26 on which the right-eye picture is formed is on the optical path of the projected light, the polarizing filter 104 becomes parallel to the cinefilm 22. Therefore, the left-eye image is transmitted through the polarizing filter 102, becomes incident on the polyhedral prism 92, and is then projected onto the screen 132 through the opposing polarizing filter 104. In this case, the left-eye image projected onto the screen 132 is deflected in the direction indicated in FIG. 8A. The right-eye image is transmitted through the polarizing filter 104, becomes incident on and is transmitted through the polyhedral prism 92, and is projected onto the screen 132 through the polarizing filter 102. In this case, the right-eye image projected on the screen 132 is deflected in the direction indicated in FIG. 8B. If both the polarizing filters 102, 104 are inclined with respect to the surface of the cinefilm 22, a superimposed image of the left-eye image and right-eye image is projected on the screen 124 by means of the polyhedral prism 92 and the relay lenses 126. In this case, the left-eye image becomes incident on polarizing filter 102 and emerges from polarizing filter 104. Therefore, the left-eye image is deflected in the direction indicated in FIG. 8A. The right-eye image becomes incident on polarizing filter 104 and emerges from polarizing filter 102. Therefore, the right-eye image is deflected in the direction indicated in FIG. 8B. When the iamges are viewed with polarized viewing glasses 16 having the left-eye polarized glass 18 deflected in the direction indicated in FIG. 8A and the right-eye polarized glass 20 deflected in the direction indicated in FIG. 8B, the left eye of the viewer observes only the left-eye image, while his right eye observes only the right-eye image. Thus, the viewer can stereoscopically view a moving image being projected onto the screen 124.

The two-dimensional observation of a still image may be described as follows. The switch 120 is set in such a way that the detection output from the photosensor 116 is supplied to the rotation control device 122. When the photosensor 116 detects the slit 116 of the slit disc 112, it supplies an ON signal to the rotation control device 122. Upon reception of the ON signal, the rotation control device 122 stops rotation of the polyhedral prism 92 and the sprockets 66 and 72. The polyhedral prism 92 and the cinefilm 22 stop, with polarizing filter 102 or 104 being parallel to the surface of the cinefilm 22. Then, either the left-eye image or right-eye image is projected onto the screen 124 and deflected in the direction indicated in FIG. 8A or 8B. Therefore, the still image projected onto the screen 124 is not stereoscopically observed, but is two-dimensionally observed. In this case, there is no need to use the polarized viewing glasses 16.

The stereoscopic observation of a still image may be described as follows. The switch 120 is set in such a way that the detection signal output from the photosensor 118 is supplied to the rotation control device 122. When the photosensor 118 detects the slit 124 of the slit disc 114, it supplies an ON signal to the rotation control device 122. Upon receipt of the ON signal, the rotation control device 122 stops the rotation of the polyhedral prism 92 and the sprockets 66, 72. At this time, the polyhedral prism 92 and the cinefilm 22 stop in the state (the state shown in FIG. 13) wherein the polarizing filters 102 and 104 are inclined at equal angles with respect to the surface of the cinefilm 22 and the optical axis of the projected light coincides with the boundary between adjacent frames 26. Therefore, both the left-eye image and right-eye image are projected onto the screen 132, being deflected in the direction indicated in FIGS. 8A and 8B and superimposed on each other. When a viewer observes these images with polarized viewing glasses 16, a still image can be stereoscopically observed.

Figure 14:
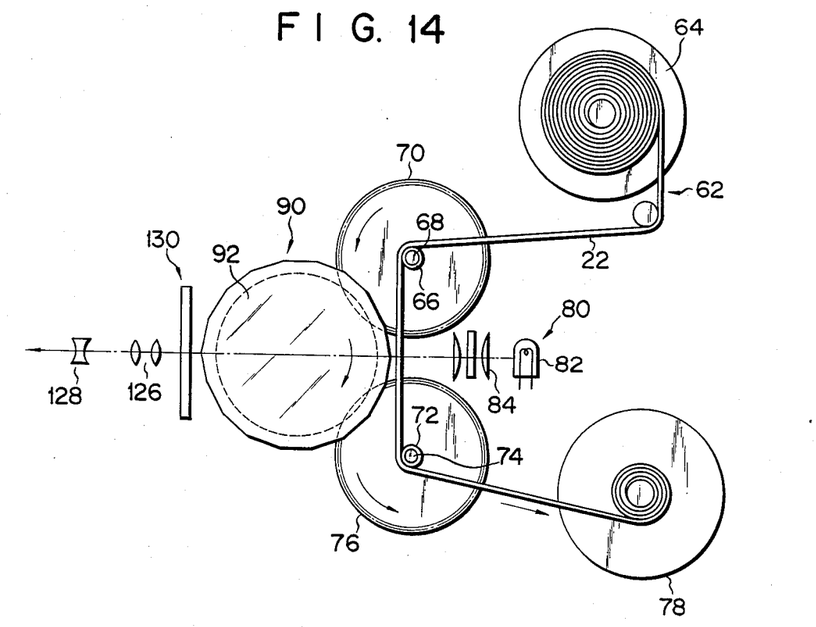
FIG. 14 is a plan view of a stereoscopic projecting apparatus according to another embodiment of the present invention.

Another embodiment of the present invention may be described as follows, with reference to FIGS. 14 and 15. Since the same reference numerals as were used in FIG. 5 denote the same parts in FIG. 14, a detailed description of the pertinent parts will be omitted here. In this embodiment, the polarizing filters 136 of a deflecting means 130 are not adhered to the incident (or emerging) planes of a polyhedral prism 92. A light guide means 90 having a polyhedral prism 92 has the same configuration as that of a known projector. The deflecting means 130 of this embodiment has a supporting disc 132 made of a transparent material, such as glass, which is interposed between the polyhedral prism 92 and relay lenses 126. The disc 132 is rotatably supported having its rotating axis parallel to the optical axis. The disc 132 is so arranged that the optical image, which is transmitted through the polyhedral prism 92, passes through the upper edge portion of the disc 132. The surface of the disc 132 is divided into sectors 134, each of which has a central angle of $\theta$ (See FIG. 7). One polarizing filter 136 or 138 is adhered to the image transmitting position of each sector 134. The polarizing filters 136, 138 have the deflecting directions shown in FIGS. 8A and 8B, and are alternately arranged. The supporting disc 132 and the polyhedral prism 92 rotate in synchronism with each other. When a left-eye image emerges outside of the polyhedral prism 92, the left-eye image is deflected by the polarizing filter 136 disposed on its optical axis, and is then projected onto the screen 132. On the other hand, when a right-eye image emerges outside of the polyhedral prism 92, the right-eye image is deflected by the polarizing filter 138 disposed on its optical path, before being projected onto the screen 124. When the image on the screen 124 is observed through the polarized viewing glasses 16, said image can be stereoscopically observed, as in the embodiment of FIG. 5.

In this embodiment, the optical image is transmitted through a polarizing filter only once. Therefore, in comparison to the embodiment of FIG. 5, wherein the optical image is transmitted through two polarizing filters, the attenuation of the output level is slight.

Figure 15:
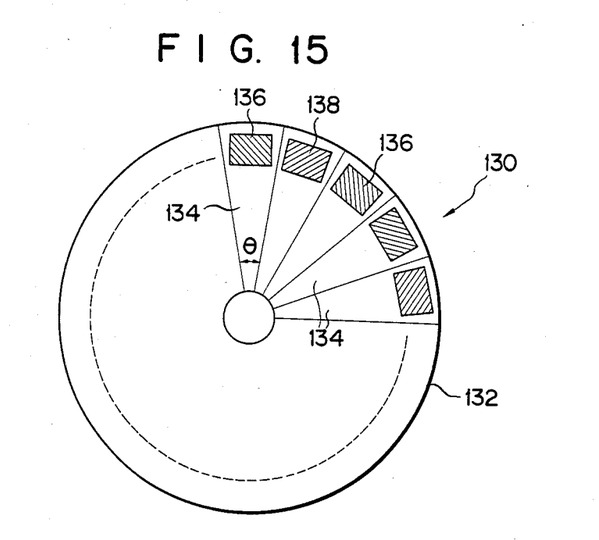
FIG. 15 is a plan view of a deflecting means of the apparatus shown in FIG. 14.

The polarizing filters 136, 138 are of a rectangular shape, as shown in FIG. 15. However, the polarizing filters 136, 138 may be sector-shaped, to cover the entire surfaces of the corresponding sectors 134. In such a case, the entire surface of the supporting disc 132 is covered with the polarizing filters, and the edges of adjacent polarizing filters 136, 138 come into contact with each other. When the deflecting means 130 of this configuration is used, a superimposed image of left and right-eye images, which images are deflected in orthogonal directions, can be projected onto the screen 132.

Figure 5:
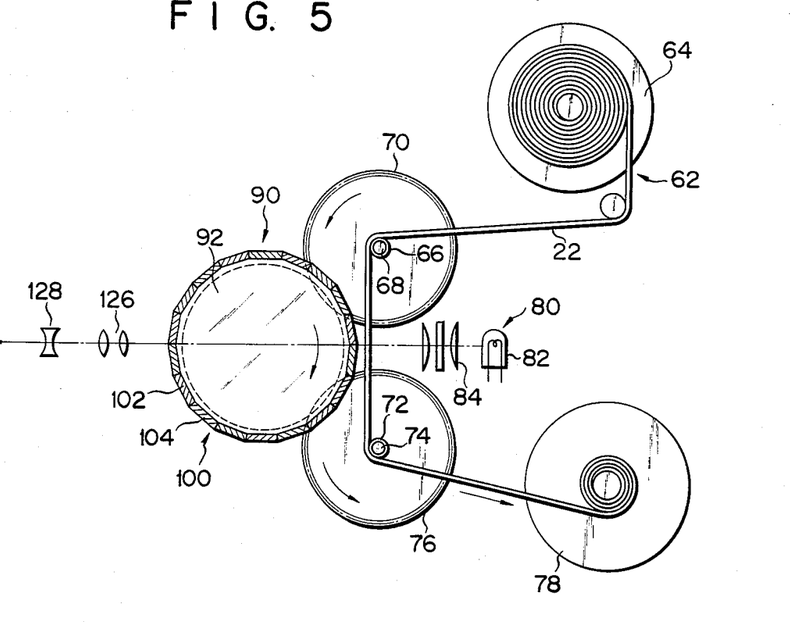
FIG. 5 is a plan view of a stereoscopic projecting apparatus according to an embodiment of the present invention.
Figure 6:
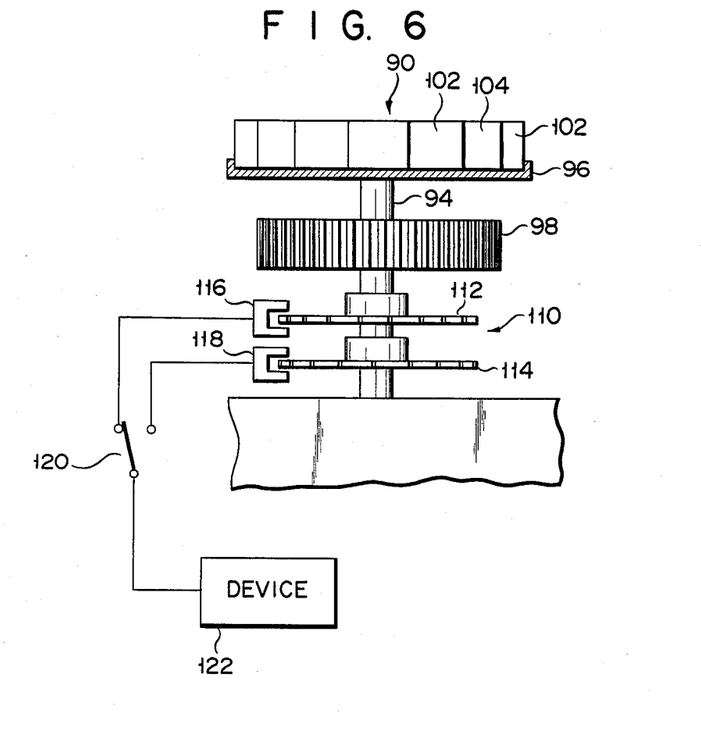
FIG. 6 is a partial side view of the apparatus shown in FIG. 5.

As shown in FIG. 5 or 7, an endless polarizing filter ring of polarizing filters 102, 104 can be so arranged as to surround the polyhedral prism 92, the sprockets 66, 72, the supply reel 64, and the take-up reel 78.

The present invention is not limited to the particular embodiments described above. For example, this invention is not limited to X-ray diagnosis, since it may also be applied to the projection of a movie in a movie theater or the like. In the above embodiments, the rotating position of the polyhedral prism 92 is detected by the slit discs 112, 114 and the photosensors 116, 118. However, it may also be detected in the following manner. The polyhedral prism 92 may be driven by a stepping motor, for example. The rotational angle of the polyhedral prism 92 may then be determined from the rotation of the motor.

What is claimed is:

1. A stereoscopic projecting apparatus which projects a stereoscopic image via a cinefilm on which left-eye pictures and right-eye pictures are alternately formed on consecutive frames, which apparatus comprises:
   a light source for projecting a beam of light toward a predetermined region;
   drive means for driving a cinefilm in such a manner that the cinefilm passes through the predetermined region toward which the light from the light source is projected;
   a prism arranged in the region through which an image transmitted from the cinefilm is passed, the prism having a plurality of planes, through which the image becomes incident or from which the image emerges, and which planes are endlessly connected;
   prism rotating means for rotating the prism about a rotating axis of the prism which includes the center of the plurality of planes and which is parallel to the plurality of planes;
   synchronizing means for synchronizing the movement of the cinefilm and the rotation of the prism, so that each of the planes of the prism becomes parallel to the surface of the cinefilm when each one of the frames of the cinefilm is located at the center of the predetermined region toward which the light is being projected, thereby projecting a moving image;
   detecting means for detecting the rotating position of the prism and producing a detection signal when one of the plurality of planes of the prism is parallel to the surface of the cinefilm, or when two adjacent planes, of the plurality of planes of the prism, are inclined at the same angle with respect to the surface of the cinefilm, in the predetermined region;
   a rotation control device for stopping the rotation of the prism upon reception of the detection signal from the detecting means, thereby two dimensionally or stereoscopically projecting a still image; and
   deflecting means for deflecting the images, which deflecting means deflects the left-eye image transmitted from the frame on which the left-eye picture is formed in a first direction, and deflects the right-eye image transmitted from the frame on which the right-eye picture is formed in a second direction, the first and second directions being perpendicular to each other.

2. An apparatus according to claim 1, wherein the predetermined region is a region through which images from two frames can be projected.

3. An apparatus according to claim 2, wherein the deflecting means has polarizing filters of a first type for deflection in the first direction and polarizing filters of a second type for deflection in the second direction, the polarizing filters of first and second types being alternately arranged on the planes of the prism.

4. An apparatus according to claim 3, wherein deflecting direction of the polarizing filters of first type is inclined at an angle of 45° with respect to the plane perpendicular to the rotating axis of the prism, and the deflecting direction of the polarizing filters of second type is perpendicular to the first direction and inclined at an angle of 45° with respect to the plane perpendicular to the rotating axis of the prism, with the polarizing filter of the first type and the polarizing filter of the second type being arranged in each pair of planes opposing with respect to the axis of the prism.

5. An apparatus according to claim 4, wherein the first and second polarizing filters number 18.

6. An apparatus according to claim 3, wherein the deflecting direction of the polarizing filters of the first type is parallel to that plane which is perpendicular to the rotating axis of the prism, the deflecting direction of the polarizing filters of the second type is perpendicular to that plane which is perpendicular to the rotating axis of the prism, and two polarizing filters of each type are arranged in each pair of planes opposing each other with respect to the axis of the prism.

7. An apparatus according to claim 1, wherein the detecting means has a slit disc which rotates in synchronism with the prism and which has slits formed at equal intervals on an outer rim thereof, the slits being the same in number as the plurality of planes of the prism; and wherein the detecting means also has a photosensor which detects light passed through the slit and produces a detection signal thereupon.

8. An apparatus according to claim 2, wherein the deflecting means has a plurality of polarizing filters of a first type for deflection in the first direction; a plurality of polarizing filters of a second type for deflection in the second direction; and a support made of a transparent material, which supports the polarizing filters of the first and second types and which can alternately locate the polarizing filters of the first and second type, within the predetermined region.

9. An apparatus according to claim 8, wherein the support is comprised of a disc, and the polarizing filters of the first and second types are circumferentially arranged along the outer rim of the disc.

* * * * *